US007000655B2

(12) United States Patent
Garvin et al.

(10) Patent No.: US 7,000,655 B2
(45) Date of Patent: Feb. 21, 2006

(54) FLUID ADDITIVE DELIVERY SYSTEMS

(75) Inventors: Gary Garvin, Mentor, OH (US); James D. Burrington, Mayfield Village, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 10/754,270

(22) Filed: Jan. 9, 2004

(65) Prior Publication Data

US 2005/0150569 A1 Jul. 14, 2005

(51) Int. Cl.
*B65B 1/04* (2006.01)

(52) U.S. Cl. ......................... 141/100; 141/98; 210/199

(58) Field of Classification Search .................... 141/2, 141/9, 100, 104, 98, 67; 4/223, 224; 422/261, 422/264; 137/268; 210/199, 206, 209
See application file for complete search history.

(56) References Cited

U.S. PATENT DOCUMENTS

| | | | | |
|---|---|---|---|---|
| 3,698,605 A * | 10/1972 | Quisling | 222/190 |
| 4,014,794 A | 3/1977 | Lewis | 210/199 |
| 4,066,559 A | 1/1978 | Rohde | 252/10 |
| 4,075,098 A | 2/1978 | Paul et al. | 210/168 |
| 4,144,166 A | 3/1979 | DeJovine | 210/60 |
| 4,144,169 A | 3/1979 | Grueschow | 210/168 |
| 4,265,748 A | 5/1981 | Villani et al. | 210/132 |
| 4,873,727 A * | 10/1989 | Homan | 4/226.1 |
| 5,209,842 A | 5/1993 | Moor | 210/168 |
| 5,327,861 A | 7/1994 | Rogalla et al. | 123/196 S |
| 5,435,912 A | 7/1995 | Baehler et al. | 210/168 |
| 5,552,040 A | 9/1996 | Baehler et al. | 210/168 |
| 5,581,823 A * | 12/1996 | Kuo | 4/226.1 |
| 5,591,330 A | 1/1997 | Lefebvre | 210/203 |
| 5,673,439 A * | 10/1997 | Kuo | 4/222 |
| 5,718,258 A | 2/1998 | Lefebvre et al. | 137/268 |
| 5,843,284 A | 12/1998 | Waters et al. | 196/46.1 |
| 6,045,692 A | 4/2000 | Bilski et al. | 210/198.1 |
| 6,374,797 B1 | 4/2002 | Fischer | 123/196 R |
| 6,379,564 B1 | 4/2002 | Rohrbach et al. | 210/765 |
| 6,397,879 B1 * | 6/2002 | Ring et al. | 137/268 |
| 6,495,495 B1 | 12/2002 | Alger et al. | 508/475 |
| 6,505,597 B1 | 1/2003 | Zulauf et al. | 123/196 R |
| 6,625,821 B1 * | 9/2003 | Lhoste | 4/231 |
| 6,843,916 B1 * | 1/2005 | Burrington et al. | 210/416.5 |
| 6,860,241 B1 * | 3/2005 | Martin et al. | 123/1 A |
| 2002/0014447 A1 | 2/2002 | Rohrbach et al. | 210/209 |
| 2002/0195384 A1 | 12/2002 | Rohrbach et al. | 210/266 |
| 2003/0111398 A1 | 6/2003 | Eilers et al. | 210/209 |

FOREIGN PATENT DOCUMENTS

| | | |
|---|---|---|
| CA | 2087773 | 7/1993 |
| DE | 4201559 | 7/1993 |
| DE | 10242850 | 7/2003 |

(Continued)

OTHER PUBLICATIONS

Pub. No. 62218610 A, Japanese Patent Office & Japio Abstract, (Sep. 26, 1987, Hajime, et al.).

(Continued)

*Primary Examiner*—Steven O. Douglas
(74) *Attorney, Agent, or Firm*—Teresan W. Gilbert; Michael F. Esposito

(57) ABSTRACT

A fluid additive delivery system includes a container for a fluid additive gel. The container has one or more openings to allow contact of the fluid with the gel to cause one or more additive components in the gel to be released into the fluid.

20 Claims, 7 Drawing Sheets

FOREIGN PATENT DOCUMENTS

| | | | |
|---|---|---|---|
| EP | 0254776 | | 2/1988 |
| EP | 0416908 | | 3/1991 |
| EP | 1061251 | A2 | 12/2000 |
| GB | 589079 | | 6/1947 |
| WO | WO 02/0588815 | | 8/2002 |
| WO | WO 02/096534 | | 12/2002 |
| WO | WO 2004/007653 | | 1/2004 |
| WO | WO 2004/033063 | | 4/2004 |

OTHER PUBLICATIONS

Pub. No. 57201510 A, Japanese Patent Office Abstract (Dec. 10, 1982, Shigenori et al.).
Pub. No. 11028318 A, Japanese Patent Office Abstract (Feb. 2, 1999, Hiromichi).

* cited by examiner

FLUID ADDITIVE DELIVERY SYSTEMS

FIELD OF THE INVENTION

The present invention relates to fluid additive delivery systems for allowing a fluid such as oil to come into contact with a fluid additive gel to cause one or more additive components in the gel to be slowly released into the fluid.

BACKGROUND OF THE INVENTION

Specially formulated slow-release fluid additives that provide for the slow release of additives into a fluid such as oil to meet certain performance requirements of the fluid are generally known. In some, the additives are incorporated into thermoplastic polymers which slowly dissolve into the fluid. In others, the additives are incorporated into polymers which are oil-permeable at elevated temperatures. In still others, the additives are incorporated into particles which are fluid-insoluble but fluid-wettable. In still others, fluid soluble solid polymers are provided, with or without additional additives being incorporated into the polymers.

Although these slow-release fluid additives are capable of introducing additives in the fluid being conditioned, it has been discovered that fluid additive gels can be used more effectively to provide for the slow release of additives into a fluid such as lubricant additives into an oil. In particular, it has been found that fluid-soluble additive gels slowly dissolve to their component fluid additive parts when contacted by the fluid. Examples of such fluid additive gels are disclosed in U.S. patent applications Ser. No. 10/196,441, filed Jul. 16, 2002, Ser. No. 10/603,644, filed Jun. 25, 2003, Ser. No. 10/603,894, filed Jun. 25, 2003 and Ser. No. 10/603,517, filed Jun. 25, 2003, which are incorporated herein by reference.

There is a need for fluid additive delivery systems that allow for the desired contact of the fluid with these fluid additive gels to cause one or more components of the additives in the gels to be slowly released into the fluid.

SUMMARY OF THE INVENTION

The present invention is for fluid additive delivery systems that allow contact of a fluid being conditioned with any desired form of a fluid additive gel to cause one or more components of the additives in the gel to be slowly released into the fluid.

In accordance with one aspect of the invention, the fluid additive delivery system includes a container for the fluid additive gel having one or more openings that allow at least some of the fluid to come into contact with the fluid additive gel for the slow release of one or more gel additive components into the fluid.

In accordance with another aspect of the invention, the fluid additive delivery system may provide for direct flow of the fluid onto the fluid additive gel for faster dissolution of the components of the additives into the fluid.

In accordance with another aspect of the invention, the fluid additive system may provide for indirect flow of the fluid onto the fluid additive gel to provide for relatively slow diffusion of one or more components of the additives into the fluid.

In accordance with another aspect of the invention, the container for the fluid additive gel may be mounted between a conventional fluid filter and the surface of a device to which the filter is normally mounted.

In accordance with another aspect of the invention, the container for the fluid additive gel may be contained in a separate housing for ease of removal and replacement of the container with another container containing a new supply of the fluid additive gel.

In accordance with another aspect of the invention, the rate of fluid flow into or through the fluid additive gel container may be varied to vary the rate of dissolution of one or more components of the additives into the fluid.

In accordance with another aspect of the invention, one or more fluid additive gel containers may be mounted inside a canister type housing having inlet and outlet passages for the flow of fluid through the housing and around the containers which may have one or more openings or passages that allow the fluid to contact the fluid additive gel inside the containers.

In accordance with another aspect of the invention, the fluid additive gel container may comprise an insert that may be placed inside a fluid filter for contact of the fluid with the fluid additive gel through one or more openings or passages in the insert.

In accordance with another aspect of the invention, the fluid additive gel container may be associated with a filler cap that is used to close off the fill opening of a reservoir containing the fluid to be conditioned.

In accordance with another aspect of the invention, the fluid additive gel container may be associated with a drain plug that is used to close off a drain opening of a reservoir containing the fluid to be conditioned.

In accordance with another aspect of the invention, the fluid additive gel container may be permanently mounted inside a reservoir for the fluid.

The fluid additive delivery system of the present invention can be used to condition the fluid in any lubricated mechanical systems including but not limited to those in internal combustion engines, natural gas engines, stationary engines, metal working coolant systems, industrial lubricated systems, oil or fuel filters, hydraulic systems and transmission systems and the like.

BRIEF DESCRIPTION OF THE DRAWINGS

The present invention may be more readily understood by reference to the following drawings in which.

DETAILED DESCRIPTION

The fluid additive delivery systems of the present invention provide for the desired contact of a fluid being conditioned with a fluid additive gel to cause one or more components of the additives in the gel to be slowly released into the fluid as described hereafter. The fluid additive delivery systems of the present invention can be used to condition the fluid in any lubricated mechanical systems including but not limited to those in internal combustion engines, natural gas engines, stationary engines, metal working coolant systems, industrial lubricated systems, oil or fuel filters, hydraulic systems and transmission systems and the like. Examples of fluid additive gels that may be delivered using the fluid additive delivery systems of the present invention are disclosed in U.S. patent applications Ser. No. 10/196,441, filed Jul. 16, 2002, Ser. No. 10/603,644, filed Jun. 25, 2003, Ser. No. 10/603,894, filed Jun. 25, 2003 and Ser. No. 10/603,517, filed Jun. 25, 2003, the entire disclosures of which are incorporated herein by reference.

Figure 1:
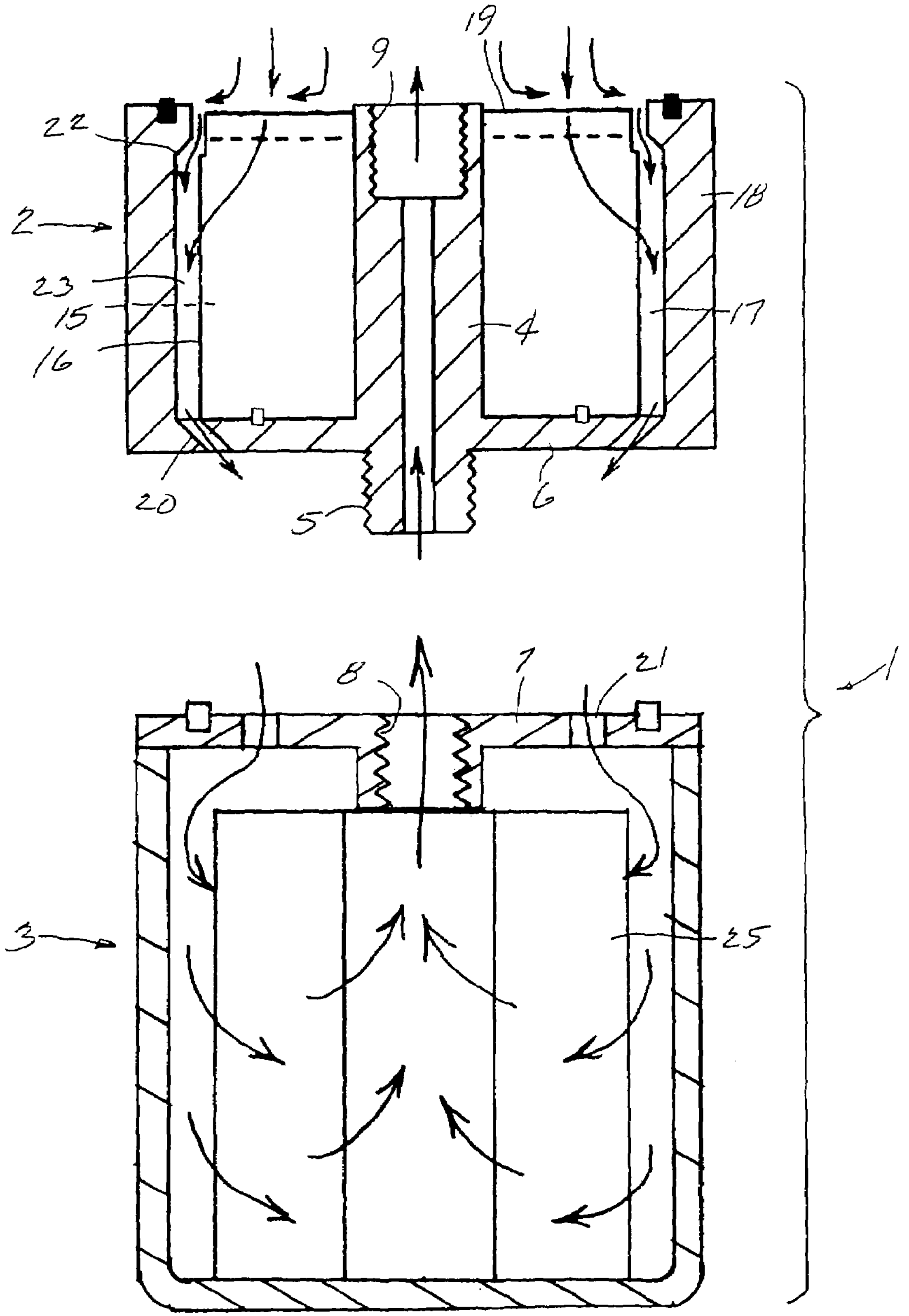
FIG. 1 is an exploded schematic longitudinal section through one form of fluid additive delivery system of the present invention including a container for the fluid additive gel fitted inside a housing which may be removably attached to the base plate of a fluid filter.

Referring now in detail to the drawings, wherein the same reference numbers are used to designate like parts, and initially to FIG. 1, there is shown one form of fluid additive delivery system 1 in accordance with the present invention including an intermediate adaptor housing 2 which is mountable between a fluid filter mounting surface of an engine block or other device (not shown) and a fluid filter 3 such as an oil filter. Adaptor housing 2 includes an inner hollow tube 4 for fluid flow that may be externally threaded at one end 5 for sealed attachment of an end wall 6 of the adaptor housing with the base plate 7 of fluid filter 3 by spinning the externally threaded end 5 of the hollow tube into a threaded opening 8 in the filter base plate. The other end 9 of hollow tube 4 may be internally threaded for sealed attachment of adaptor housing 2 to a mounting surface by spinning the internally threaded end 9 onto an externally threaded hollow tubular fitting on the mounting surface (not shown).

A container 16 containing any desired form of the fluid additive gel 15 may be placed in the void space 17 of adaptor housing 2 between inner hollow tube 4 and the outer side wall 18 of the adaptor housing as schematically shown in FIG. 1 before attaching the adaptor housing to the mounting surface of the device and attaching the fluid filter to the adaptor housing. Fluid from the device will flow in the direction of the arrows past the gel container 16, which may have one or more openings therein such as open end 19, and out through a plurality of outlet openings 20 in the adaptor housing end wall 6 and into the fluid filter through a plurality of inlet openings 21 arranged in a circular pattern in the filter base plate. The inner surface of side wall 18 of adaptor housing 2 may have an undercut 22 to create a flow path 23 for the fluid around the gel container 16. Also the outlet openings 20 in end wall 6 of the adaptor housing may be inwardly angled as shown in FIG. 1 to match up with the inlet openings 21 in filter base plate 7 when fluid filter 3 is attached to adaptor housing 2.

The fluid entering fluid filter 3 will pass through filter element 25 which may be fabricated of any suitable filtering medium and then back out through the threaded outlet opening 8 in filter base plate 7 and through inner hollow tube 4 in adaptor housing 2 for return to the engine block or other device. The direct flow of fluid across the gel at the open end 19 of the gel container 16 as shown in FIG. 1 will result in the relatively fast dissolution of the fluid additive components into the fluid.

Figure 2:
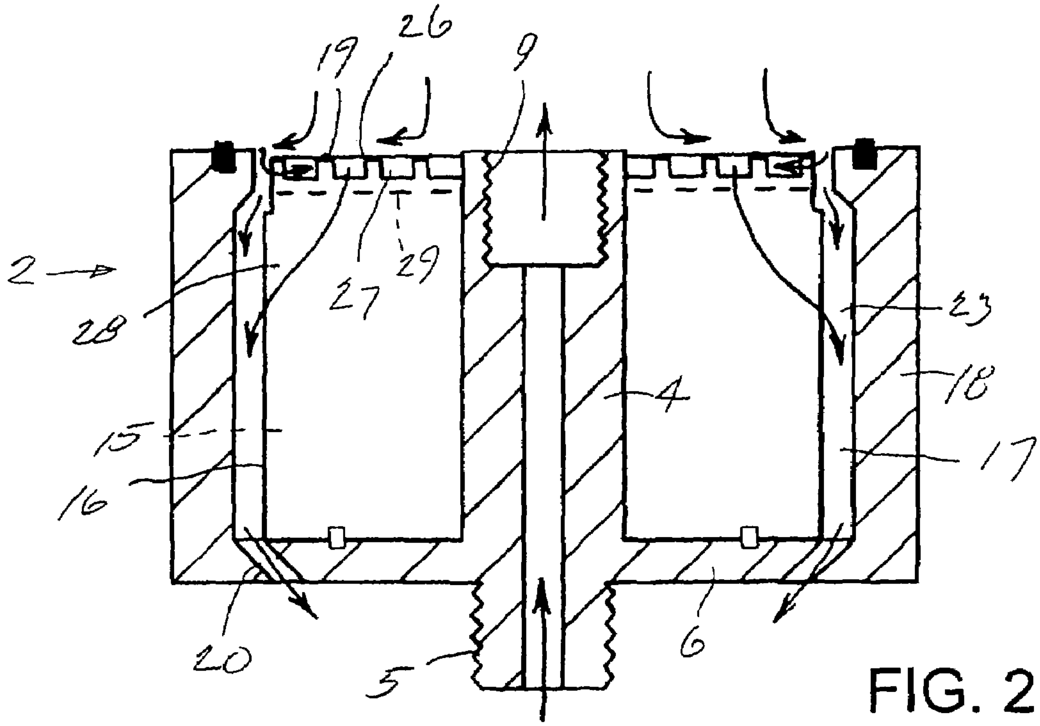
FIGS. 2 and 3 are schematic longitudinal sections through other forms of containers for the fluid additive gel fitted inside a housing which may be removably attached to a fluid filter similar to the housing shown in FIG. 1.

If desired, the end 19 of gel container 16 may be closed off by an end cap or cover plate 26, and one or more slots or openings 27 may be provided in the side wall 28 of the container above the gel level 29 in the container 16 as shown in FIG. 2. This provides for indirect flow of the fluid past the gel in the container by allowing some of the fluid to enter the container through the openings 27 and dissolve selected components of the additives in the gel which slowly diffuse out through the openings and are then carried off by the fluid flow in the flow path 23 around the container.

Figure 3:
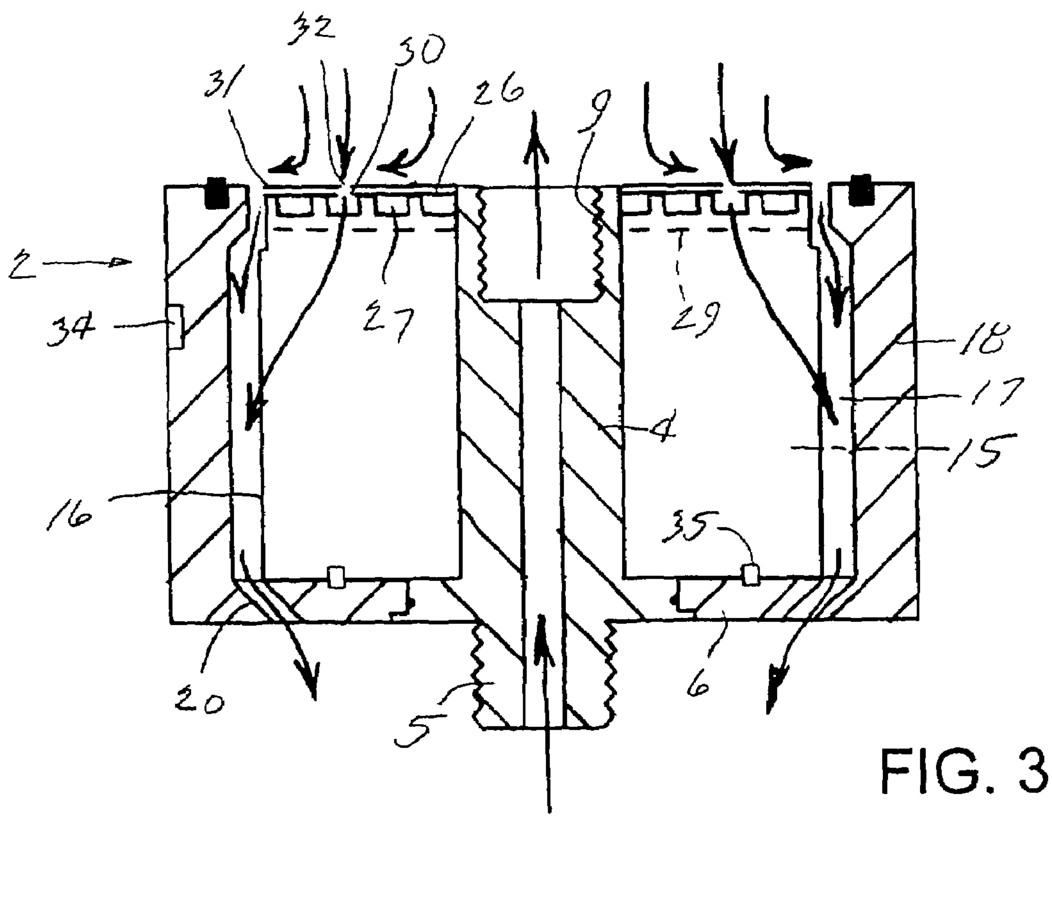

One or more openings 30 may also be provided in the container cover 26 to provide for increased flow of fluid into and out of the container as shown in FIG. 3. The number, size and location of the openings 30 in cover 26 and openings 27 in the container side wall 28 will determine the rate of flow of the fluid past the gel inside the container and thus the rate of dissolution of the components of the additives into the fluid.

Figure 4:
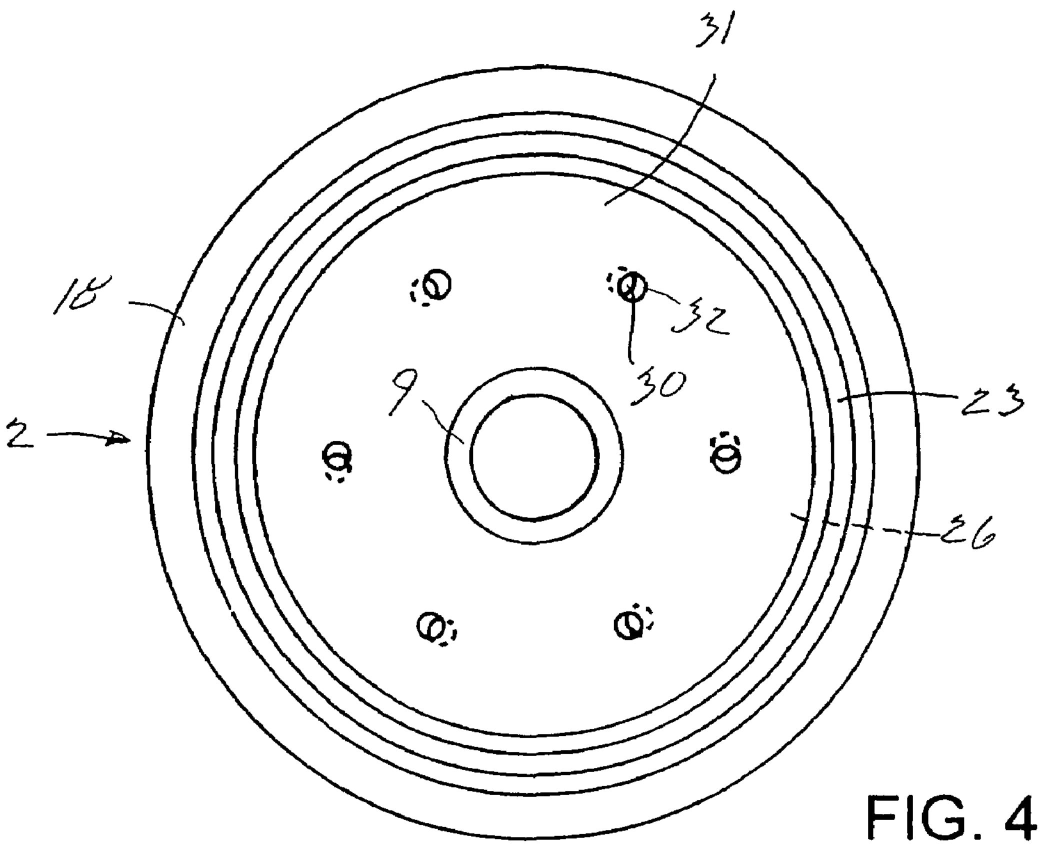
FIG. 4 is a top plan view of the fluid additive gel container and housing of FIG. 3.

This flow rate may be varied as by attaching a diverter plate 31 having one or more openings 32 therein to the outlet end 9 of the inner tube 4 in overlying relation to the gel container cover plate 26. The inner tube 4 and adaptor housing 2 including outer side wall 18 and end wall 6 may be of a two-piece construction as shown in FIG. 3 to permit indexing of the adaptor housing relative to the inner tube and thus the diverter plate 31 carried thereby. Also gel container 16 may be pinned to the housing at 35 as further shown in FIG. 3. Accordingly, controlled indexing of the adaptor housing 2 relative to the inner tube 4 will cause a change in the amount of overlap of one or more holes 32 in diverter plate 31 with one or more openings 30 in the gel container cover plate 26 as schematically shown in FIG. 4 to direct fluid flow in varying proportions through and around the container to vary the rate of dissolution of the components of the additives into the fluid. A rate indicator 34 of any suitable type may be provided in the outer wall 18 of adaptor housing 2 to provide a visual indication of the rate of dissolution of the additives into the fluid as by detecting the indexed position of the adaptor housing 2 relative to the inner tube 4 and thus the amount of overlap between the holes 34 in diverter plate 31 and the holes 30 in the gel container cover plate 26.

Figure 5:
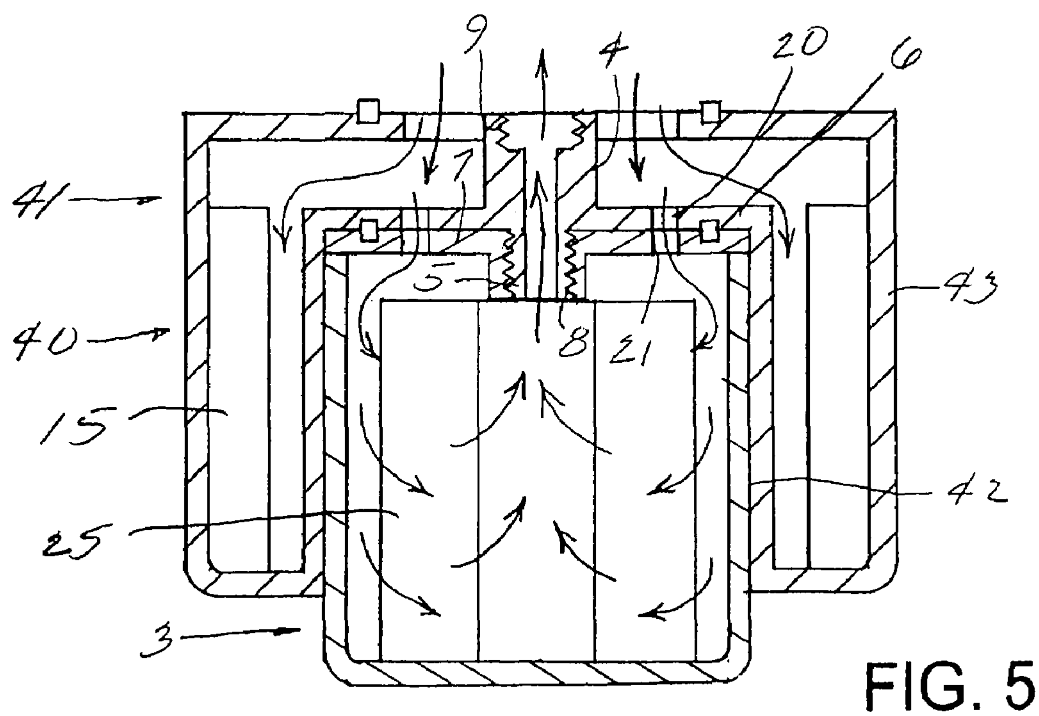
FIG. 5 is a schematic longitudinal section through another fluid additive delivery system of the present invention including a housing containing the fluid additive gel which has a longitudinal recess at one end for at least partially receiving a fluid filter when attached thereto for use in situations where because of space constraints, the combined length of the housing and fluid filter must be shorter.

FIG. 5 shows another fluid additive delivery system 40 of the present invention including an intermediate adaptor housing 41 for the fluid additive gel 15 that is adapted to be mounted between a fluid filter 3 and a mounting surface of an engine block or other device similar to the adaptor housing 2 of FIGS. 1–4. However, the adaptor housing 41 shown in FIG. 5 is made wider than the filter 3 and includes a longitudinal recess 42 at one end for at least partially receiving the filter when attached to the externally threaded end 5 of the housing inner tube 4 for use in situations where because of space constraints, a longer combined length of the adaptor housing and filter is prohibitive but an increase in circumferential size of the adaptor housing is not.

Figure 6:
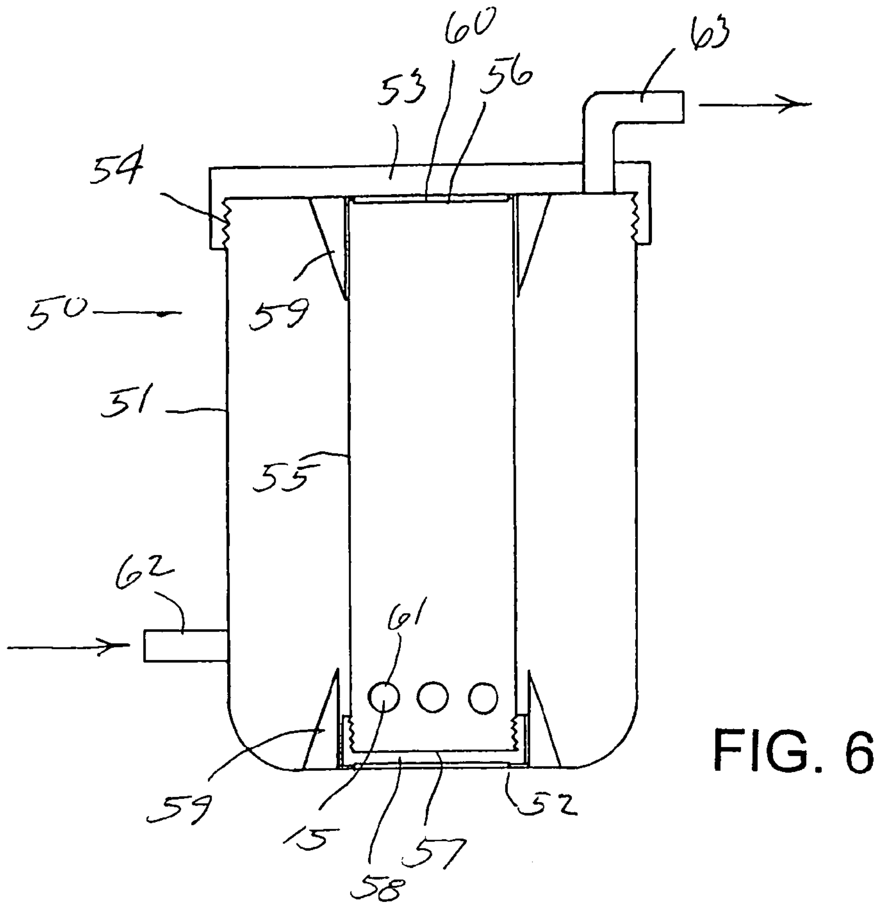
FIGS. 6–8 are schematic longitudinal sections through other fluid additive delivery systems of the present invention including different forms of containers for the fluid additive gel mounted inside a canister housing having inlet and outlet passages for the flow of fluid through the canister.
Figure 7:
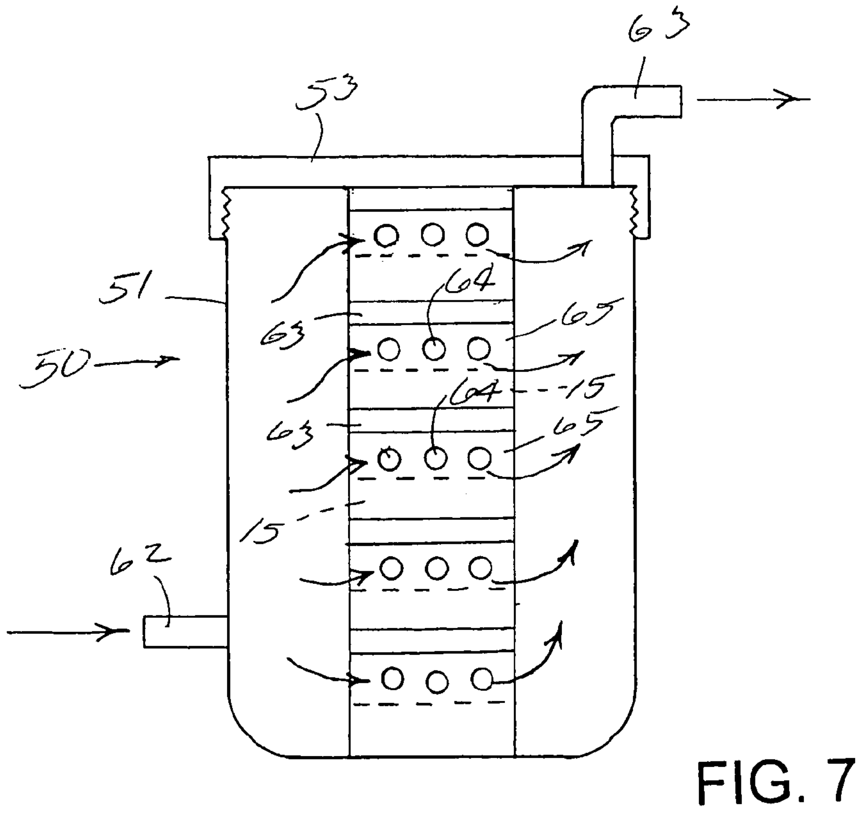
Figure 8:
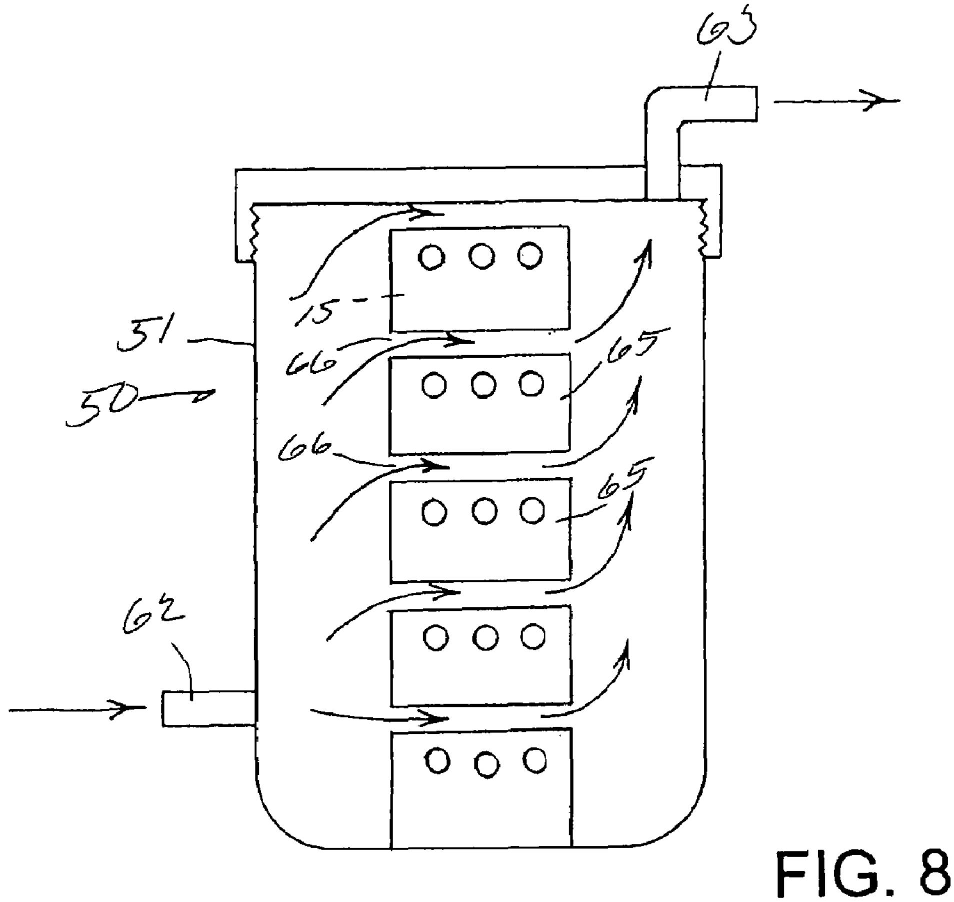

One or more containers containing any desired form of fluid additive gel may also be placed in a canister-like housing that may be used to add one or more components of the fluid additive gel to the fluid at different locations in a system. FIGS. 6–8 show a fluid additive system 50 of the present invention including a canister-like housing 51 that is closed at one end 52 and has a removable lid 53 at the other end 54 which when removed permits one or more gel filled containers to be mounted inside the canister. FIG. 6 shows a cartridge-like container 55 which may be open at one end 56 for filling with a matrix of desired components which make up the gel 15. The other end 57 of container 55 may be closed and have a lid 58 or the like threaded thereon to aid in locating the other end between suitable guides 59 on the closed end of the canister. Similar guides 59 may be provided on the canister lid 53 for locating the open end of the container within the canister when the canister lid is secured in place. A suitable compression seal 60 or the like may be provided between the lid 53 and open end of the container for sealing off the open end inside the canister.

One or more openings 61 may be provided in the container for contact of the gel 15 by the fluid as it flows into and out of the canister through inlet and outlet passages 62 and 63 on opposite sides adjacent opposite ends thereof. The size, number and location of the openings 61 in container 55 will determine the amount of surface area of the fluid additive gel contacted by the fluid passing through the canister and thus the rate of dissolution of one or more components of the additive gel into the fluid. A metering valve (not shown) may be provided for controlling the amount of fluid flow through the canister.

FIG. 7 shows a plurality of shorter cylindrical shaped containers 65 stacked one on top of another inside canister 51. For indirect flow of the fluid past the gel, the open ends of the containers may be closed as by lids 63, and one or more holes 64 may be provided in the sides of the containers above (or below) the level of the gel 15 inside the containers as schematically shown in FIG. 7 to allow some of the fluid to enter the containers through the holes for dissolving one or more components of the gel which slowly diffuse into the fluid flowing around the containers.

For direct flow of the fluid past the gel 15 for faster delivery of one or more additive components of the gel to the fluid, one or both ends of the containers 65 may be left open and open spaces 66 provided between the containers to allow the fluid to flow across the gel in the containers as schematically shown in FIG. 8.

Figure 9:
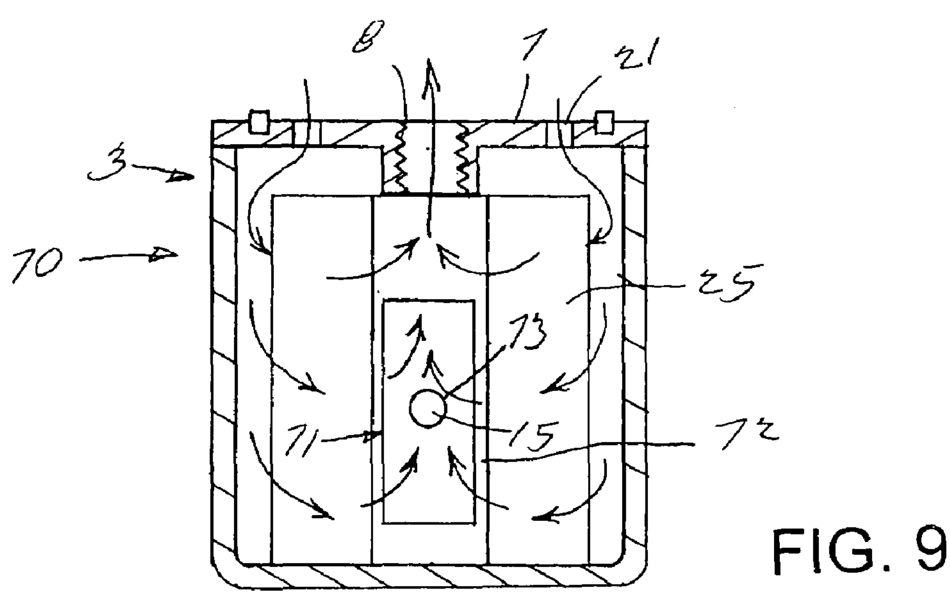
FIG. 9 is a schematic longitudinal section through another fluid additive delivery system of the present invention including an insert type container for the fluid additive gel shown placed within the fluid flow passage of a fluid filter downstream of the filter element.

FIG. 9 shows another fluid additive delivery system 70 of the present invention including an insert type container 71 for the fluid additive gel 15 which may be placed directly within the return fluid flow path in the open center 72 of a fluid filter 3 downstream of the filter element 25 as schematically shown in FIG. 9. Insert 71 may have one or more openings 73 at the ends and/or along the sides to provide sufficient surface area of the additive gel for contact by the fluid to obtain a desired release rate of the components of the additives into the fluid.

Figure 10:
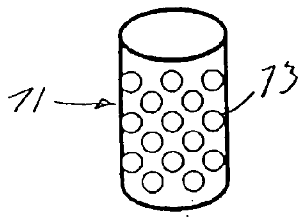
FIGS. 10–18 are schematic perspective views of different fluid additive gel container inserts of the present invention.
Figure 11:
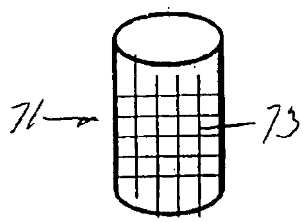
Figure 12:
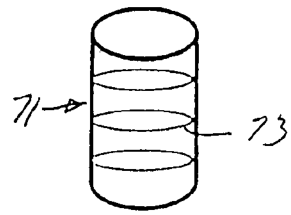
Figure 13:
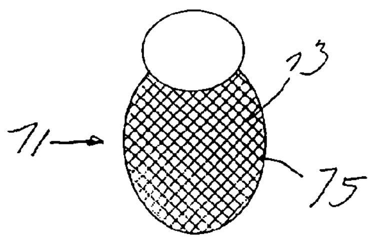
Figure 14:
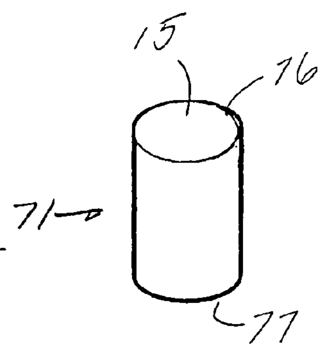
Figure 15:
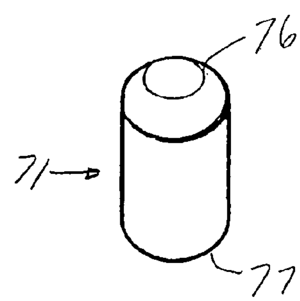

The openings 73 may be incorporated into the insert 71, for example, by the use of perforated rigid materials such as plastic, by use of a mesh or screen, or by the introduction of holes or slots as by drilling or machining either before or after the additive material is introduced into the inserts. FIG. 10 shows an insert 71 with multiple drilled holes 73; FIG. 11 shows the holes 73 formed by perforating an insert 71 made out of a rigid material; FIG. 12 shows holes 73 formed by slits in the sides of an insert; and FIG. 13 shows holes 73 formed by making the insert out of a mesh or screen 75. FIGS. 14 and 15 show inserts 71 that may be open at one or both ends 76 and 77. Also, the open end or ends may be fluted as shown in FIG. 15 to help prevent the gel from sliding out of the insert.

Figure 16:
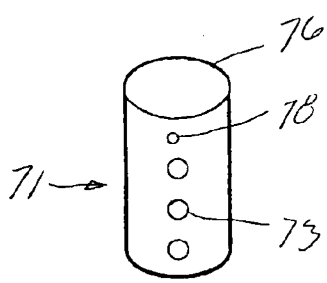
Figure 17:
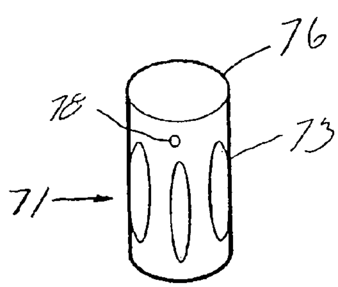
Figure 18:
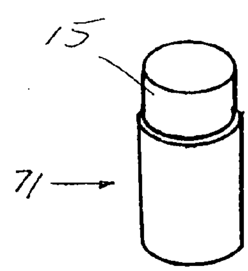

A plurality of axially spaced holes 73 may also be provided in the side of the insert 71 as shown in FIG. 17. Also axially extending, circumferentially spaced slots 73 may be provided in the side of the insert 71 as shown in FIG. 18. Moreover, one or more smaller weep holes 78 may be provided in the sides of the inserts 71 adjacent an open end 76 thereof to allow for some flow of fluid through the inserts when the gel 15 at the open end erodes below the level of the weep holes. Further, a portion of the additive gel 15 may be exposed to the fluid by removing a portion of the length of the insert 71 as schematically shown in FIG. 16 after the additive material has gelled inside the insert.

If additive is introduced into the inserts after the holes are formed in the inserts, a blocking film (not shown) may be used to prevent the flow of additive out of the inserts until the additive material is gelled. This film can be removed after gelling but before use of the inserts, or if the film is made of a material which will dissolve in the fluid, the film may be left on the inside or outside of the inserts.

Figure 19:
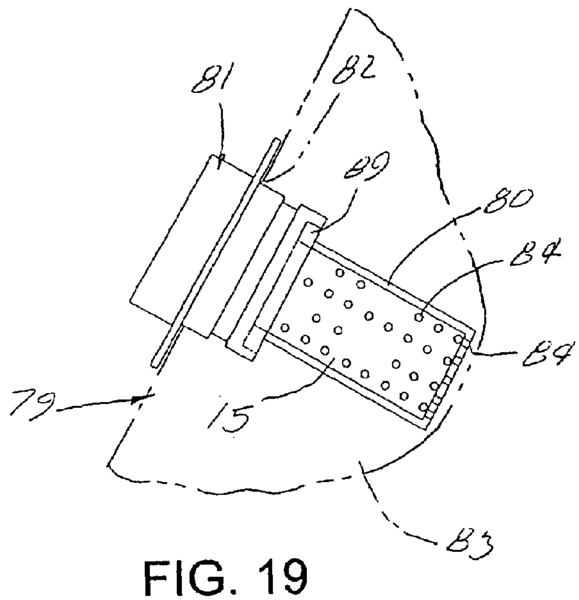
FIG. 19 is a schematic perspective view of fluid additive delivery system of the present invention including a container or holder for the fluid additive gel incorporated in a filler cap used to close off the fill opening of a reservoir containing the fluid.
Figure 20:
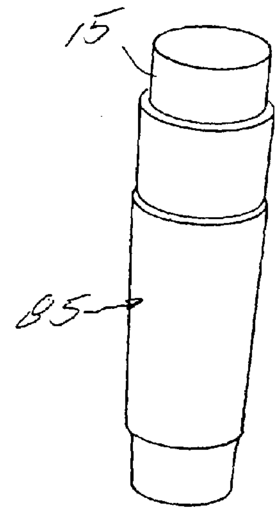
FIGS. 20 and 21 are perspective views of other fluid additive gel containers of the present invention.

FIG. 19 shows another fluid additive delivery system 79 of the present invention including a cartridge type insert 80 containing any desired form of fluid additive gel 15 inserted into a filler cap 81 used to close off the fill opening 82 of a reservoir 83 containing the fluid to be conditioned. Filler cap 81 may have a closable access opening in the outer end thereof through which the gel containing insert 80 may be inserted and retained in place by a flange 89 on the inner end of the insert. The length of the insert exposed to the fluid may vary as may the size, number and placement of the holes 84 in the side and/or end walls of the insert for varying the surface area of the gel exposed to the fluid in the reservoir. Filler cap 81 may be designed to accept a new cartridge insert 80 whenever the gel needs to be replenished. Alternatively, the cartridge insert 80 may be refilled by unplugging the access opening and injecting additional fluid additive gel into the insert using an injector type gel container 85 such as shown in FIG. 20. Further, if desired an injector type gel container 85 may be used to inject gel 15 directly into the reservoir 83 through the fill hole 82 after the filler cap 81 has been removed therefrom. The gel will slowly dissolve in the fluid over time, replenishing the additives in the fluid.

Figure 21:
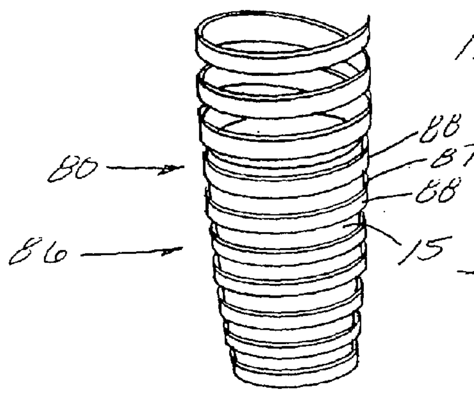

Cartridge insert 80 may have openings or holes similar to the openings or holes in the inserts shown in FIGS. 10–18. Alternatively the cartridge insert may be in the form of a compression spring 86 such as shown in FIG. 21 which when compressed will provide a substantially closed compartment inside the spring that can be filled with additive material and kept compressed until the additive material is gelled. After gelling, the spring 86 can be allowed to expand, which creates spaces 87 between the spring turns 88 for exposing the gel 15 inside the spring to the fluid inside the reservoir when inserted into the reservoir fill opening and held in place by the filler cap 81.

Figure 22:
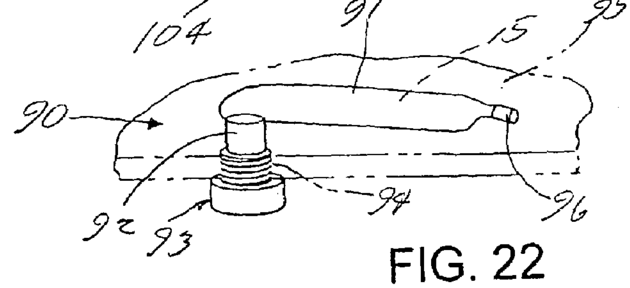
FIG. 22 is a schematic perspective view of another fluid additive delivery system of the present invention including a bag-like container for the fluid additive gel connected to a drain plug used to close off a drain opening of a reservoir containing the fluid.

FIG. 22 shows another fluid additive delivery system 90 of the present invention including a bag-like container 91 for the fluid additive gel 15 that may be attached to a hollow inner tubular portion 92 of a drain plug 93 used to close off a drain opening 94 of a reservoir 95 containing the fluid to be conditioned. The bag-like container 91 may be made of a filter cloth type material to allow the fluid to contact the gel inside the bag. To install the bag in the reservoir, the bag may initially be rolled up inside the hollow tubular portion 92 of the drain plug. After the drain plug has been inserted into the drain opening 94, the bag may be filled by injecting the gel 15 into the bag through a closable opening in the drain plug (not shown). A magnet 96 may be provided on the outer end of the bag to hold the bag in place against the bottom of the reservoir.

Figure 23:
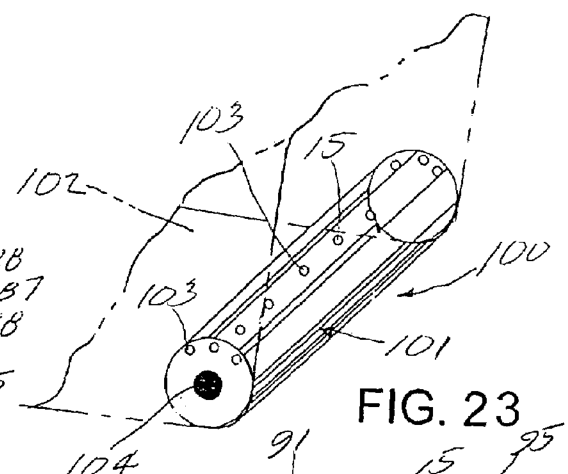
FIG. 23 is a schematic perspective view of another fluid additive delivery system of the present invention including a gel container permanently mounted inside a reservoir for the fluid.

FIG. 23 shows another fluid additive delivery system 100 of the present invention including a box-like gel container 101 mounted inside a fluid reservoir 102 such as an oil sump (oil pan). One or more openings 103 may be provided in the side walls and/or end walls of the container for contact of the gel 15 inside the container by the fluid in the reservoir. The size, number and placement of the holes or openings 103 in the container may be varied as desired for varying the surface area of the gel exposed to the fluid in the reservoir. Also if desired, a refill port 104 may be provided in the container that may be accessible through a closable access opening (not shown) in the wall of the reservoir for replenishing the container with gel. Alternatively, the entire container inside the reservoir may be replaced with another container containing a fresh supply of gel.

Although only a few embodiments of the present invention have been described above, it should be appreciated that many modifications can be made without departing from the spirit and scope of the invention. All such modifications are intended to be included within the scope of the present invention, which is to be limited only by the following claims.

What is claimed is:

1. A fluid additive delivery system comprising 1) a fluid additive gel, 2) a container for the gel, the container having one or more openings to allow contact of the fluid with the gel to cause one or more additive components in the gel to be released into the fluid, 3) a housing for receiving the container, and 4) means for mounting the housing between a fluid filter and a fluid filter mounting surface of a device, the housing containing flow passages for directing the fluid from the device past the container and through the filter back to the device and wherein the container is removably mounted inside the housing.

2. The system of claim 1 wherein the number, size and location of the openings in the container is selected to control the surface area of the gel contacted by the fluid to tailor the release rate of the gel into the fluid to suit a particular application.

3. The system of claim 1 wherein the container has an open end for exposing the gel inside the container to the fluid entering the housing from the device.

4. The system of claim 1 wherein the container has a closed end to prevent contact of the fluid entering the housing from the device with the gel at the closed end, and one or more of the openings are in a side or end wall of the container adjacent the closed end.

5. The system of claim 4 wherein at least some of the openings in the side wall are unobstructed by the gel inside the container to allow some of the fluid to enter the container through the openings and dissolve one or more additive components in the gel.

6. The system of claim 1 wherein the container has an end cap containing one or more of the openings to allow some of the fluid entering the housing from the device to flow into the container and out through one or more additional openings in a side wall of the container above the level of the gel inside the container.

7. The system of claim 6 further comprising a diverter plate overlying the end cap having one or more openings therein, the container and diverter plate being indexable relative to one another to vary the amount of overlap of the openings in the diverter plate with the openings in the end cap for controlling the amount of fluid that is allowed to flow through the end cap openings.

8. The system of claim 1 wherein the housing is wider than the fluid filter and includes a longitudinal recess in one end for at least partially receiving the fluid filter in the recess.

9. The system of claim 1 wherein the container is a cartridge that is mounted inside a canister type housing that has inlet and outlet passages adjacent opposite ends for permitting fluid to flow through the housing and around the cartridge.

10. The system of claim 1 wherein a plurality of containers for the gel are mounted inside a canister type housing that has inlet and outlet passages adjacent opposite ends for permitting fluid to flow through the housing and around the containers.

11. The system of claim 10 wherein the containers are stacked one on top of another inside the housing and have one or more of the openings in a side wall of the containers for allowing contact of the fluid with the gel inside the containers.

12. The system of claim 10 wherein at least one end of the containers is open and the containers are mounted in spaced relation from one another inside the housing to allow fluid to contact the gel at the open ends of the containers.

13. The system of claim 1 wherein the container comprises an insert that is mounted inside a fluid filter to allow contact of the gel with the fluid passing through the filter.

14. The system of claim 1 wherein the container is associated with a cap or plug that is used to close off an opening to a reservoir containing the fluid.

15. The system of claim 14 wherein the container comprises an insert that is inserted into a filler cap used to close off a fill opening of the reservoir.

16. The system of claim 14 wherein the container comprises a filter type bag that is attached to a drain plug used to close off a drain opening of the reservoir.

17. The system of claim 1 wherein the container is permanently mounted inside a reservoir for the fluid.

18. The system of claim 1 wherein the container comprises a compression spring having a plurality of turns surrounding the fluid additive gel, with spaces between the turns when the spring is expanded for exposing the gel to the fluid between the turns.

19. A fluid additive delivery system comprising 1) a fluid additive gel, 2) a container for the gel wherein the container has an end cap containing one or more of the openings to allow some of the fluid entering the housing from the device to flow into the container and out through one or more additional openings in a side wall of the container above the level of the gel inside the container 3) a housing for receiving the container, and 4) means for mounting the housing between a fluid filter and a fluid filter mounting surface of a device, wherein the housing containing flow passages for directing the fluid from the device past the container and through the filter back to the device resulting in one or more additive components in the gel released into the fluid.

20. A fluid additive delivery system comprising 1) a fluid additive gel, 2) a container for the gel wherein the container having one or more openings to allow contact of the fluid with the gel and 3) a canister type housing containing a plurality of containers for the gel mounted inside the canister and wherein the canister has inlet and outlet passages adjacent opposite ends for permitting fluid to flow through the housing and around the containers resulting in the release of one or more additive components of the gel into the fluid.

* * * * *